L. S. BOYER.
EMERGENCY WATER CUT-OFF.
APPLICATION FILED JULY 8, 1914.
1,196,925.
Patented Sept. 5, 1916.
2 SHEETS—SHEET 2.
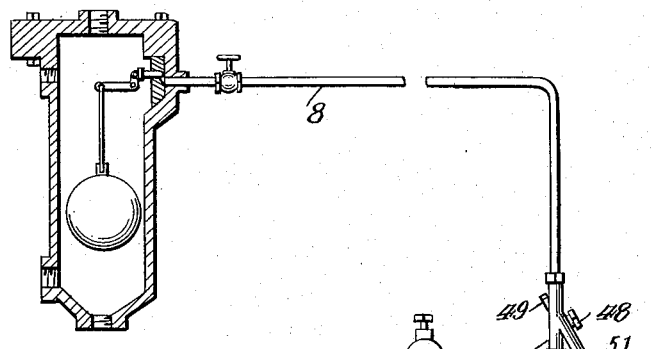
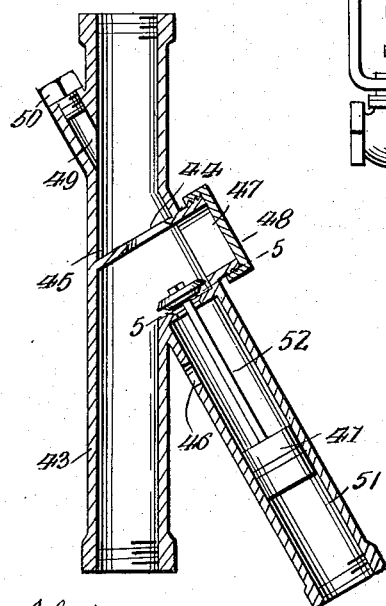
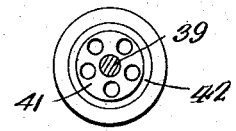
Witnesses
Guy M. Spring
Lloyd W. Patch
Inventor
Lewis S. Boyer.
By Richard B. Owen.
Attorney

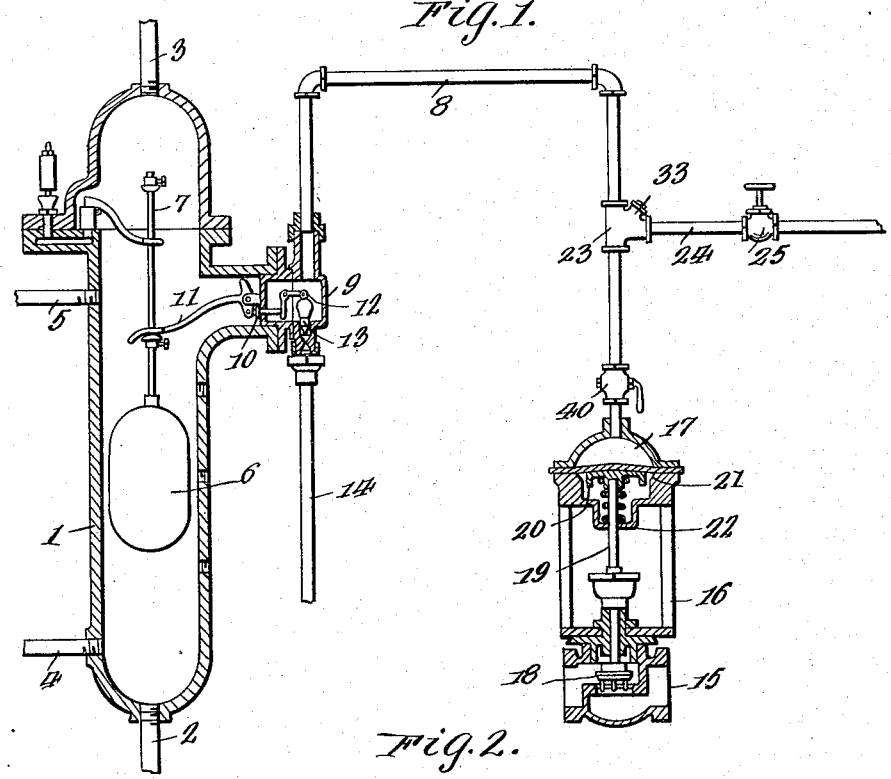
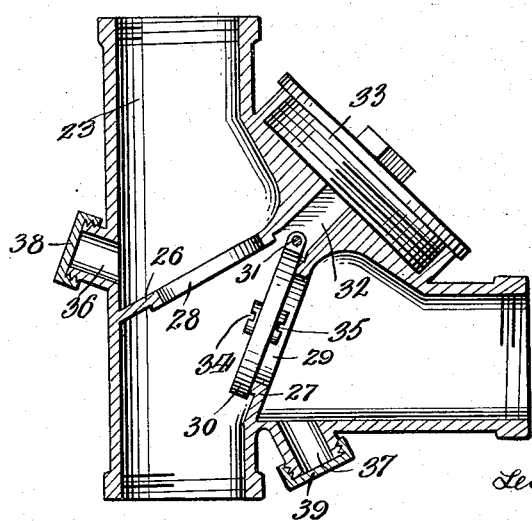

UNITED STATES PATENT OFFICE.

LEWIS S. BOYER, OF WASHINGTON, DISTRICT OF COLUMBIA.

EMERGENCY WATER CUT-OFF.

1,196,925.

Specification of Letters Patent.

Patented Sept. 5, 1916.

Application filed July 8, 1914. Serial No. 849,819.

*To all whom it may concern:*

Be it known that I, LEWIS S. BOYER, a citizen of the United States, residing at Washington, in the District of Columbia, have invented certain new and useful Improvements in Emergency Water Cut-Offs, of which the following is a specification.

The object of my invention is to provide a device of this character which can be used in connection with an automatic boiler feed regulator, so constructed and arranged that the parts of the feed regulator may be operated to cut off the supply of water through the feed water pipe and the supply of water to the boiler may be stopped without recourse to the manually operated valve in the water supply pipe.

When an automatic boiler feed regulator is used in connection with the supply to a battery of boilers, a controlling valve is mounted in the water-supply line to each boiler and in the standard form now in use this valve is constructed to be controlled by fluid pressure. A regulator is connected with each of the boilers of the battery to limit and regulate the supply of fluid furnished to actuate the controlling valve. Under ordinary operating conditions a feed regulator so connected is highly efficient, but any abnormal condition at one of the boilers to which the regulator is attached, causes that abnormal condition to be felt at each of the remaining boilers and destroys their regularity of operation. Thus the breaking of a tube in one of the boilers would permit the water in the regulator to drop to such a point that, even though the fluid supply be connected from the regulator to the controlling valve to hold this valve closed at the time, the controlling valve would have the fluid pressure relieved therefrom and would be permitted to open to allow the flow of water to the boilers. For instance, if a tube of one of the boilers should burst this would permit the opening of the controlling valve and would not only cause an over-supply of water to the damaged boiler but would also cause an under-supply of water to pass to the several other boilers. Provision could be made to cut off the water supply under such condition by placing a valve in this pipe which could be closed to stop the flow of feed water, but in most instances it is not convenient to run this feed water pipe to a point where it will be readily accessible to the operator, and it is an object of my invention to provide means to maintain a fluid pressure under such conditions to hold the controlling valve closed.

With other objects in view, which will be referred to, my invention consists in the peculiar combination and novel arrangement of parts, such as will be hereinafter more fully described in connection with the accompanying drawings and more particularly pointed out in the appended claims.

In the drawings, Figure 1 is a view in vertical cross section of an antomatic boiler feed regulator showing my invention applied thereto. Fig. 2 is an enlarged sectional view through the cut-off to better illustrate the details of construction. Fig. 3 is a view similar to Fig. 1 showing a modified form of the device. Fig. 4 is an enlarged detail sectional view of a portion of the structure disclosed in Fig. 3. Fig. 5 is a sectional view on the line 5—5 of Fig. 4, looking in the direction of the arrow.

The regulator casing 1 is connected by a pipe 2 with the boiler at a point below the water level therein, and a pipe 3 connects this regulator body with the boiler at a point above the water level and this connection might be with the steam dome. The regulator case is preferably placed at such a height that the water will normally rise within the case to a depth to raise the float 6, to be hereinafter set forth, to approximately the height shown in Fig. 1, and if desired, a water glass or other visible gage may be connected to the pipes 4 and 5 which extend through the side of the regulator body or casing. A small float 6 is mounted in the regulator casing and is adapted to rise and fall therein with the level of the water, and this float has the usual stem 7.

By connecting the pipes 2 and 3 with the boiler as stated, I insure that the level of the water in the regulator is always the level of the water in the boiler and the steam in the upper part of the regulator case is at the same pressure as the steam in the boiler.

A fluid pipe 8 is connected at its one end with a valve casing 9 mounted around an opening in the regulator case 1 and this pipe 8 at its free end is connected with a diaphragm chamber 17 formed at the upper part of the controlling valve case 16. The valve casing 9 has an inlet valve 10 positioned therein to close the port opening into the regulator casing 1 and an arm 11 is pivoted adjacent this inlet valve 10 to, when in its free position cause the valve to close and cut off access from the regulator case to the pipe 8. This lever 11 extends around the stem 7 of the float and a stop on this stem is positioned to raise the lever to permit the inlet valve 10 to open when the water is at the proper level in the regulator case. An exhaust pipe 14 is connected with the valve case 9 and an exhaust valve 13 is positioned to control the passage of fluid from this valve casing through the pipe 14. A bell-crank lever 12 is mounted in the casing 9 to control the movement of the exhaust valve 13. The parts are all arranged so that the inlet valve 10 engages with the free arm of the bell-crank lever 12 and when the parts are in the relation shown in Fig. 1 with the inlet valve open the exhaust valve is closed, but when the water level in the regulator case drops to such a point that the stop on the float stem moves down to let the arm 11 fall, the inlet valve 10 is pressed in against the bell-crank lever 12 and opens the exhaust valve 13 to permit the passage of fluid from the valve casing 9 and consequently from the pipe 8 out through the exhaust pipe 14.

A valve casing 15 adapted to be connected in the feed water line has the case 16 mounted thereon and as stated heretofore this case 16 has a diaphragm chamber 17 on the upper part thereof with which the fluid pipe 8 connects. A valve 18 is positioned in the valve case 15 to open and close this case to the passage of feed water therethrough and this valve has a stem 19 which extends up through the casing 16 to a point that the head 20 thereof rests against the diaphragm 21 positioned in the diaphragm chamber 17. A coil spring 22 is mounted around the stem 19 in the lower part of the diaphragm chamber and holds the valve normally open as shown in Fig. 1, and so the parts would remain normally, but when the pressure in the diaphragm chamber 17 becomes sufficiently great that the diaphragm 21 is expanded this exerts pressure against the head 20 on the stem 19 of the valve 18 and this valve 18 is consequently closed against its seat in the case 15.

The operation of the parts as described is as follows, the valve 18 is normally held open by the coil spring 22. When sufficient water has been supplied to the boiler the water level in the regulating case 1 raises to a point as indicated in Fig. 1. This permits opening of the inlet valve 10 from the regulating case to the valve case 9, and consequently the steam is permitted to flow through the pipe 8 to the diaphragm chamber 17 where it causes the diaphragm 21 to be depressed and consequently closes the valve 18 against its seat thus cutting off or materially lessening the flow of water through the feed water line. As the quantity of water in the boiler decreases, the level in the regulator case is consequently lowered and this lowering of the water in the case when it becomes excessive will permit closing of the inlet valve 10 and consequent opening of the exhaust valve 13 which establishes communication between the pipe 8 and the exhaust pipe 14. With the parts in this position the steam pressure in the diaphragm chamber 17 exhausts back through the pipe 8 and through the pipe 14 to relieve the pressure in the diaphragm chamber and to permit the valve 18 to be opened by spring 22.

The cut-off valve casing 23 is made T-shape and the straight arm thereof has the pipe 8 connected therein. An auxiliary fluid supply pipe 24 is connected with the remaining branch of the casing 23 and leads to any suitable source of fluid supply which may be steam or air, the passing of the fluid therethrough being controlled by a manually operated valve 25. The casing 23 has a partition 26 disposed diagonally across one of the alined branches and a similar partition 27 is arranged in a like manner across the branch disposed at right angles thereto. The partitions 26 and 27 have passages 28 and 29, respectively, formed therethrough so that communication is established within the casing between the pipe 8 and the pipe 24. A valve 30 is hinged by pin 31 within the casing so that it can swing against either the partition 26 or the partition 27 and will consequently close the passage 28 in its one position and passage 29 in its second position. The valve 30 is made sufficiently heavy that it normally rests in the latter position, that is, in a position to close the passage 29 through the partitions 27 and thus cut off communication from the pipe 24 to the casing 23. The parts of this cut-off valve normally occupy the relative position shown in Fig. 2, thus permitting free passage of fluid in either direction through the pipe 8. Now, when the exhaust valve 13 is open which permits the escape of fluid from the diaphragm chamber 17 and it is desired to depress the diaphragm 21 to close the valve 18, the valve 25 in the auxiliary fluid supply pipe 24 will be opened, this causes pressure to be exerted against the valve 30 and this valve is raised or swung around its pivot 31 against the tension of gravity to a position that it closes passage 28 in the partition 26 and communication is established between the auxiliary fluid supply pipe 24 and the lower portion of the pipe 8. With the parts in this relation the fluid has a free passage from the fluid supply pipe 24 to the diaphragm chamber 17 and the diaphragm 21 will consequently be depressed to close the valve 18 which valve will be held closed as long as the pressure is maintained in the diaphragm chamber 17.

When it is again desired to bring the regulator into connection to actuate the controlling valve, the manually operated valve 25 will be closed, and escape valve 40 in the pipe 8 will be opened to permit a reduction of the pressure in the diaphragm chamber 17 and consequently to permit the return of the valve 30 from its seated position over the passage 28 to its seated position to close the passage 29. The parts are now in their normal position and will be actuated by the regulator as before.

The case 23 is provided with a slot 32 through the portion adjacent the hinge connection of the valve 30, which slot is so arranged that the valve may be inserted into the case therethrough and thereby inserting the pin 31 through the opening in this valve the swinging connection is formed, a plug 33, being provided to close the outer end of the slot 32 to prevent the escape of fluid therefrom. The valve 31 has the slots 34 and 35 formed on the opposite sides thereof, and openings 36 and 37 are provided through the case 23 to permit the insertion of a screw-driver or other instrument to be engaged in said slots to turn the valve against either the seat around the passage 28 or the seat around the passage 29, this turning movement of the valve to grind the valve and seat being permitted by a withdrawal of the pin 31. Caps 38 and 39 are provided to close the openings of the case.

In the disclosure in Fig. 4, the cut-off valve casing 43 is connected in the pipe 8 and is provided with a slide valve chamber 51 made in the form of a branch arm and is the one of which the auxiliary fluid supply pipe 24 is connected. A slide valve 52 is mounted in the valve chamber 51 and the weighted piston 41 attached to the valve holds this valve normally in a position that the valve proper closes against the seat 42 to cut the branch 51 from the main case 43.

The valve head is made of a diameter less than the diameter of the piston 41 and thus when fluid is supplied through the pipe 24 to the branch 51 this piston and the valve are moved against the pressure in the case and the valve is closed against the seat 44 provided around the opening through the partition 45 located in the case 43 to cut off the supply of fluid through the pipe 8 and to permit the exhaust of the fluid in the lower part of this pipe back through the branch 51 and out through vent 46 to the atmosphere. An opening 47 closed by cap 48 is provided to permit the assemblage of the valve and an opening 49 closed by plug 50 is positioned to permit the insertion of a tool to turn and grind this valve.

In Fig. 3, I have shown the cut-off valve applied to a slightly different form of boiler feed regulator, and in this form the essential difference is, that in place of the diaphragm 21 as disclosed in Fig. 1, a piston 51 is provided to be moved in the one direction or the other by the fluid pressure and thus actuate and control the valve in the feed water line.

From the foregoing, it will be seen that I have provided a cut-off which may be connected in the line of an automatic boiler feed regulator and during the normal operation of this regulator will be inactive, but when brought into operation performs the function intended for it very simply and efficiently.

While I have herein shown and described but specific forms and adaptation of my invention, it will be understood that slight changes might be made in the form and arrangement of the parts without departing from the spirit and scope of my invention, and hence, I do not wish to be limited thereto except for such limitations as the claims may import.

I claim:—

1. In combination with an automatic boiler feed regulator adapted to be operated by fluid pressure, a cut-off mounted in the fluid supply line and connected with an auxiliary fluid supply pipe, and all of said parts so arranged that the supply of fluid through the auxiliary pipe cuts off the main line and connects the auxiliary line with one of the branches thereof.

2. In combination with an automatic boiler feed regulator adapted to be operated by fluid pressure, a cut-off casing mounted in the fluid supply line and connected with an auxiliary fluid supply pipe, a valve located in the casing to normally cut off communication to the auxiliary fluid supply pipe, and the valve and said auxiliary fluid supply pipe so arranged that when fluid is supplied through said pipe the valve is moved to a position to cut off communication through the main pipe and to establish communication between said auxiliary fluid supply pipe and one of the branches of the main line.

3. In combination with an automatic boiler feed regulator adapted to be operated by fluid pressure, a cut-off casing mounted in the fluid supply line and connected with an auxiliary fluid supply pipe, a valve located in the casing, said valve mounted to normally move by gravity to a position to close the passage through the auxiliary fluid supply pipe, and mounted in such a manner that when fluid is supplied through the auxiliary fluid supply pipe this valve is moved against the gravity force to a position to cut off the main line and to establish communication between the auxiliary fluid supply pipe and one of the branches of the main line.

In testimony whereof I affix my signature in presence of two witnesses.

LEWIS S. BOYER.

Witnesses:
T. F. FOLTZ,
W. A. KING.

Copies of this patent may be obtained for five cents each, by addressing the "Commissioner of Patents, Washington, D. C."